(12) United States Patent
Bjorner et al.

(10) Patent No.: US 9,900,222 B2
(45) Date of Patent: Feb. 20, 2018

(54) VALIDATING ROUTING TABLES OF ROUTING DEVICES

(71) Applicant: Microsoft Technology Licensing, LLC, Redmond, WA (US)

(72) Inventors: Nikolaj Skallerud Bjorner, Woodinville, WA (US); Karthick Jayaraman, Kirkland, WA (US); Geoffrey Hugh Outhred, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 14/923,328

(22) Filed: Oct. 26, 2015

(65) Prior Publication Data
US 2017/0118083 A1  Apr. 27, 2017

(51) Int. Cl.
H04L 12/28   (2006.01)
H04L 12/24   (2006.01)
H04L 12/741  (2013.01)
H04L 12/751  (2013.01)
H04L 12/703  (2013.01)

(52) U.S. Cl.
CPC .............. H04L 41/12 (2013.01); H04L 45/02 (2013.01); H04L 45/745 (2013.01); H04L 45/28 (2013.01)

(58) Field of Classification Search
None
See application file for complete search history.

(56) References Cited

U.S. PATENT DOCUMENTS 5,583,848 A  12/1996 Glitho
6,266,706 B1  7/2001 Brodnik et al.
(Continued)

FOREIGN PATENT DOCUMENTS

CN  104301186 A  1/2015

OTHER PUBLICATIONS

Bjørner, et al., "Checking Cloud Contracts in Microsoft Azure," In Proceedings of 11th International Conference on Distributed Computing and Internet Technologies, Feb. 5, 2015, 13 pages.
(Continued)

*Primary Examiner* — Otis L Thompson, Jr.
(74) *Attorney, Agent, or Firm* — Harness, Dickey & Pierce, P.L.C.

(57) ABSTRACT

A system performed by a computing device for validating routing tables of routing devices is provided. The routing tables map destination addresses to a next hops of the routing device. The system accesses one or more contracts that specify the desired behavior of a routing table of a routing device by specifying destination addresses and permissible next hops. For each routing device, the system generates a violation predicate for each contract that is applicable to the routing device. When a violation predicate is evaluated for a target destination address and a target next hop of the routing device, the violation predicate indicates whether the routing table violates the contract. The system then solves the violation predicates for all possible combinations of a target destination address and target next hops to determine whether any routing table violates the desired behavior of its routing device as specified by a contract.

23 Claims, 7 Drawing Sheets

(56) References Cited

U.S. PATENT DOCUMENTS

| | | | | |
|---|---|---|---|---|
| 6,980,549 | B1* | 12/2005 | Shabtay | H04L 12/4641 370/392 |
| 7,523,218 | B1 | 4/2009 | Sahni et al. | |
| 8,130,759 | B2* | 3/2012 | Cohen | H04L 41/14 370/392 |
| 8,259,612 | B2 | 9/2012 | Cai et al. | |
| 8,396,066 | B1 | 3/2013 | Banerjee et al. | |
| 8,611,355 | B1 | 12/2013 | Sella et al. | |
| 8,868,745 | B1* | 10/2014 | Muley | H04L 63/0272 709/223 |
| 8,996,917 | B1* | 3/2015 | Chandramohan | G06F 11/3696 714/26 |
| 9,124,507 | B1* | 9/2015 | Sella | H04L 41/12 |
| 9,270,592 | B1* | 2/2016 | Sites | H04L 45/7453 |
| 2002/0078199 | A1* | 6/2002 | Tahan | H04L 63/0272 709/225 |
| 2004/0098720 | A1 | 5/2004 | Hooper | G06F 9/3851 718/102 |
| 2006/0165053 | A1* | 7/2006 | Bhatnagar | H04L 67/02 370/351 |
| 2007/0025355 | A1* | 2/2007 | Cohen | H04L 41/145 370/392 |
| 2009/0327316 | A1* | 12/2009 | Sahni | H04L 45/00 |
| 2010/0091685 | A1* | 4/2010 | Agrawal | H04L 45/02 370/254 |
| 2012/0099443 | A1* | 4/2012 | Makishima | H04L 43/10 370/248 |
| 2012/0163197 | A1* | 6/2012 | Cohen | H04L 41/145 370/250 |
| 2012/0203825 | A1* | 8/2012 | Choudhary | H04L 65/4076 709/203 |
| 2015/0082370 | A1* | 3/2015 | Jayaraman | H04L 63/20 726/1 |
| 2015/0263897 | A1* | 9/2015 | Ganichev | H04L 49/35 370/254 |

OTHER PUBLICATIONS

Liu, et al., "FAR: A Fault-avoidance Routing Method for Data Center Networks with Regular Topology ," In Proceedings of the Internet Engineering Task Force 89, Mar. 7, 2014, 40 pages.

Degermark, et al., "Small Forwarding Tables for Fast Routing Lookups," In Proceedings of the ACM conference on Applications, technologies, architectures, and protocols for computer communication, vol. 27, Sep. 16, 1997, pp. 3-14.

"Verify Persistent Routing Table Entries," Published on: Aug. 6, 2010, Available at: https://technet.microsoft.com/en-us/library/cc940127.aspx.

Draves, et al., "Constructing Optimal IP Routing Tables," in Technical Report MSR-TR-98-59, Nov. 1998, 27 pages.

"Routing in Packet Switching Networks," Published on: Sep. 4, 2006, Available at: cs.iupui.edu/~xkzou/teaching/CS436/chapter7_I2.ppt.

Abts, et al., "A Guided Tour through Data-center Networking," In Journal of Networks, vol. 10, Issue 5, May 3, 2012, pp. 1-22.

Bjørner, et al., "Formal Foundations for Networking," In Formal Foundations for Networking, Dagstuhl Reports, vol. 5, Issue 2, Feb. 8, 2015, pp. 44-63.

Mai, et al., "NetAgg: Using Middleboxes for Application-specific On-path Aggregation in Data Centres," In Proceedings of 10th ACM International on Conference on Emerging Networking Experiments and Technologies, Dec. 2, 2014, pp. 249-261.

Schiff, et al., "Reclaiming the Brain: Useful OpenFlow Functions in the Data Plane," In Proceedings of 13th ACM Workshop on Hot Topics in Networks, Oct. 27, 2014, pp. 1-7.

Bianchi, et al., "OpenState: Programming Platform-independent Stateful OpenFlow Applications Inside the Switch," In Journal of ACM SIGCOMM Computer Communication Review, vol. 44, Issue 2, Apr. 2014, pp. 44-51.

* cited by examiner

VALIDATING ROUTING TABLES OF ROUTING DEVICES

BACKGROUND

Data center can have tens of thousands of servers that provide a variety of services to customers of the data center. When providing these services, servers typically need to communicate (by sending packets of data) with one or more other servers or external computing devices. For example, if a group of servers perform a parallel algorithm, each server may need to notify the other servers that its portion of the algorithm has been completed. As another example, servers that host an e-commerce web site need to receive communications from computing devices accessing the web site and sent responsive communications to the computing devices. In addition, the servers that host the web site may need to communicate with other servers that host a database of products for sale and other servers that host a database of order and payment information. With large data centers, it is important that the communications be delivered both reliably and in a timely manner.

To support such delivery, a data center includes a network interconnection system. Although the network interconnection system could employ a full mesh connection, the number of such connections is $O(n^2)$, where n is the number of servers. To avoid such a large number of connections, a typical network interconnection system includes various routing devices, such as routers and switches, that are arranged hierarchically. With a hierarchical arrangement, each server is connected to at least one routing device at the lowest level and the routing devices at the lowest level are connected to routing devices at the next highest level, and so on up the hierarchy to root routing devices.

FIG. 1 illustrates a network interconnection system of a data center with hierarchically arranged routing devices. The network interconnection system 100 includes four levels 110, 120, 130, and 140. The inter-data-center level 110 is the first level (or root, top, or highest level) and includes an inter-data-center set 111 of routing devices such as routing devices 111a through 111b. The routing devices of the inter-data-center level provide connections to other data centers and the Internet. The data center level 120 is the second level (or next lower level) and includes data center sets 121 through 129 of routing devices. Data center set 121 includes routing devices 121a through 121b, and data center set 129 includes routing devices 129a through 129b. The routing devices of the data center level are connected to the routing devices of the inter-data-center level. The cluster level 130 is the third level (or next lower level) and includes cluster sets 131 through 139 of routing devices. A cluster is a collection of servers whose communications are routed through a cluster set. Cluster set 131 includes routing devices 131a through 131c, and cluster set 139 includes routing devices 139a through 139c. The routing devices of the cluster level are connected to the routing devices of the data center level. The leaf level 140 is the fourth level (or lowest level) and includes leaf sets 141 through 149 of routing devices. Each leaf set may include only one routing device such as routing devices 141a, 142a, and 149a, which may be top-of-rack switches. The routing devices of the leaf level are connected to the routing devices of the cluster level. The routing devices of the leaf level are connected to the individual servers in the rack (e.g., via a local area network). Other example network interconnection systems may include more or fewer levels depending on the size of the network, the bandwidth of the connections, timing constraints, and so on. For example, some network interconnection systems include a level between the inter-data-center level and the data center level, referred to as a border level. The border level may connect data centers within a geographic region.

A network interconnection configuration for a data center defines the topology of the network interconnection system. The network interconnection configuration specifies the number of levels, number of sets in each level, and number of routing devices in each set. For example, a network interconnection configuration may specify five levels with the first level having one set of three routing devices, the second level having four sets of four routing devices, the third level having eight sets of ten routing devices, and so on. The network interconnection configuration also specifies the connections between the levels. For example, the network interconnection configuration may specify that each routing device of the second level is connected to each routing device of the first level. The network interconnection may also specify connections between the third level and the second level as follows. Each routing device of a set in the third level is connected to only one set of the second level but is connected to every routing device in that set at the second level. Furthermore, the network interconnection configuration may also specify that at least one routing device in each set at the third level is connected to each of the sets of the second level, which means that the number of routing devices in a set at the third level is greater than or equal to the number of sets at the second level. If the third level has cluster sets with eight routing devices each and the second level includes four sets, then the connections for the routing devices of a cluster set may be a specified in Table 1.

TABLE 1

| Routing Device | Connects To |
| --- | --- |
| Cluster Set 1, device a | Every device in Data Center Set 1 |
| Cluster Set 1, device b | Every device in Data Center Set 1 |
| Cluster Set 1, device c | Every device in Data Center Set 2 |
| Cluster Set 1, device d | Every device in Data Center Set 2 |
| Cluster Set 1, device e | Every device in Data Center Set 3 |
| Cluster Set 1, device f | Every device in Data Center Set 3 |
| Cluster Set 1, device g | Every device in Data Center Set 4 |
| Cluster Set 1, device h | Every device in Data Center Set 4 |

Each routing device and server in a data center has an address. Most data centers are Internet Protocol ("IP") networks that employ an IP addressing scheme to address devices such as IP version 4 ("IPv4") or IP version 6 ("IPv6"). IPv4 specifies an IP address of 32 bits that is divided into a network address portion and a host address portion. IPv4 addresses are typically represented by four numbers that vary from 0 to 255 and are separated by periods, such as "10.168.1.1." IPv4 originally allowed the network address portion to be 8, 16, or 24 bits, referred to as class A, B, or C IP addresses, respectively. The combination of IP address and class uniquely identifies a host, which is represented as "10.168.1.1/B" for an IPv4 class B address. Because these three network address sizes meant that many host addresses might go unused, IPv4 was updated to employ the Classless Inter-Domain Routing ("CIDR") in which the network address could vary in size from 1 to 31 bits. The combination of the IP address and the number of bits in the network address, referred to as a network address mask, uniquely identifies a host, which is represented as "10.168.1.1/20" for an IPv4 address with a 20 network address. The 32-bit IP address of IPv4 was thought at one time to be large enough to uniquely identify all hosts of each network. Because of the rapid growth of the Internet and computer networks for both organizations and individuals, a 32-bit IP address proved to be not large enough. IPv6 was developed to overcome the 32-bit limitation of IPv4. IPv6 specifies that an IP address has 128 bits and can thus address over $10^{28}$ more addresses than IPv4.

Each routing device has a unique IP address and has some number of ports through which direct connections are made to other devices (e.g., routing devices or servers). Table 2 illustrates an example of the IP address of the device to which the ports of a routing device may be connected.

TABLE 2

| Port | IP Address |
| --- | --- |
| 1 | 100.0.0.1 |
| 2 | 100.0.0.2 |
| 3 | 100.0.0.3 |
| 4 | 100.0.0.4 |
| 5 | 192.168.0.0 |
| 6 | 192.168.0.1 |
| 7 | 156.0.0.1 |
| 8 | 156.0.0.1 |

Table 2 indicates that port1 is connected to the device with the IP address of 100.0.0.1. Table 2 also indicates that port7 and port8 are both connected to the device with the IP address of 156.0.0.1.

The routing devices use routing tables to control the routing of packets through the appropriate connections to ensure that the packets get from their source devices to their destination devices. Each packet includes a destination address (e.g., IP address) and typically includes a source address. As a packet is routed, each routing device through which the packet is routed is considered to be a "hop" along the path of connections between routing devices from the source address to the destination address. The routing table of a routing device specifies, for each possible destination address, the next hop to which the routing device will send that packet. Table 3 illustrates an example routing table.

TABLE 3

| Address Range | Via |
| --- | --- |
| 10.0.0.24/31 | 100.0.0.1 (port1) or |
|  | 100.0.0.2 (port2) |
| 10.0.0.0/24 | 100.0.0.1 (port1) or |
|  | 100.0.0.2 (port2) or |
|  | 100.0.0.3 (port3) or |
|  | 100.0.0.4 (port4) |
| 120.0.128.0/25 | 192.168.0.0 (port5) or |
|  | 192.168.0.1 (port6) |
| other | 156.0.0.1 (port7) or |
|  | 156.0.0.1 (port8) |

The routing table of Table 3 maps address ranges to ports through which packets with a destination address within the range or to be mapped. In this example, the addresses are CIDR IPv4 addresses. The address ranges are specified by an IP address and a mask. The first rule (i.e., entry) of Table 3 specifies the address range of "10.0.0.24/31." Because the mask is 31, the addresses in the range have the same higher order 31 bit as 10.0.0.24. Since only the lowest order bit can vary, the range has two addresses: 10.0.0.24 and 10.0.0.25. The second rule specifies the address range of "10.0.0.0/24." Because the mask is 24, only the lower 8 bits can vary, and the range includes 256 addresses from 10.0.0.0 to 10.0.0.255. The ranges "10.0.0.24/31" and "10.0.0.0/24" both include the addresses 10.0.0.24 and 10.0.0.25. However, when a routing device receives a packet, it applies the rules in order of longest mask. So in this case, even though both ranges include addresses 10.0.0.24 and 10.0.0.25, the routing device will apply the first rule, which has the longest mask, to a packet, and if it has one of the addresses in the range, it sends the packet to a next hop as specified by the rule. Each rule includes the "via" or next hops to which a packet with a destination address within the range of the rule is to be routed. The first rule specifies that the next hop is either through port1 or port2, and the third rule specifies that the next hop is both port5 and port6 (i.e., the packet is sent via both connections).

A data center is a dynamic in the sense that clusters of servers may be added, removed, or resized as needed to support the computing needs of customers. As customer's needs change, the routing tables of the routing devices need to be updated to meet the needs of the customers. In addition, various problems in a data center may result in the network interconnection system not functioning as intended. For example, if a routing device fails, a routing device connected to the failed routing device may update its routing table so that the failed routing device is not a next hop. If a packet can get to its destination only via the failed routing device, then the packet is undeliverable. Even if a packet could get to its destination using a different routing device (e.g., because of built-in redundant paths), the benefits of having the redundant paths (e.g., increased overall bandwidth) may be lost. Similarly, if a desired connection between routing devices is never made or fails (e.g., because a technician mistakenly removed the connection), packets may not reach their destination. Because of the size and complexity of a network interconnection system, it can be very difficult and time-consuming to manually verify the correctness of the network interconnection system. Currently, problems are typically detected only after an incident has occurred, such as a routing device logging an undeliverable message. When such a problem is detected, a technician may be assigned to investigate and correct the problem.

SUMMARY

A method and system performed by a computing device for validating routing tables of routing devices are provided. The routing tables map destination addresses to a next hops of the routing device. The system accesses one or more contracts that specify the desired behavior of a routing table of a routing device by specifying destination addresses and permissible next hops. For each routing device, the system generates a violation predicate for each contract that is applicable to the routing device. When a violation predicate is evaluated for a target destination address and a target next hop of the routing device, the violation predicate indicates whether the routing table violates the contract. The system then solves the violation predicates for all possible combinations of a target destination address and target next hops to determine whether any routing table violates the contract. If the violation predicates for a routing device indicate no violation, then the system has validated that the routing table complies with the contracts for the routing device. If, however, a violation predicate indicates a violation for a combination of a target destination address and target next hops, then the routing table does not comply with the contract of the violation predicate for that combination of the target destination address and target next hops.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
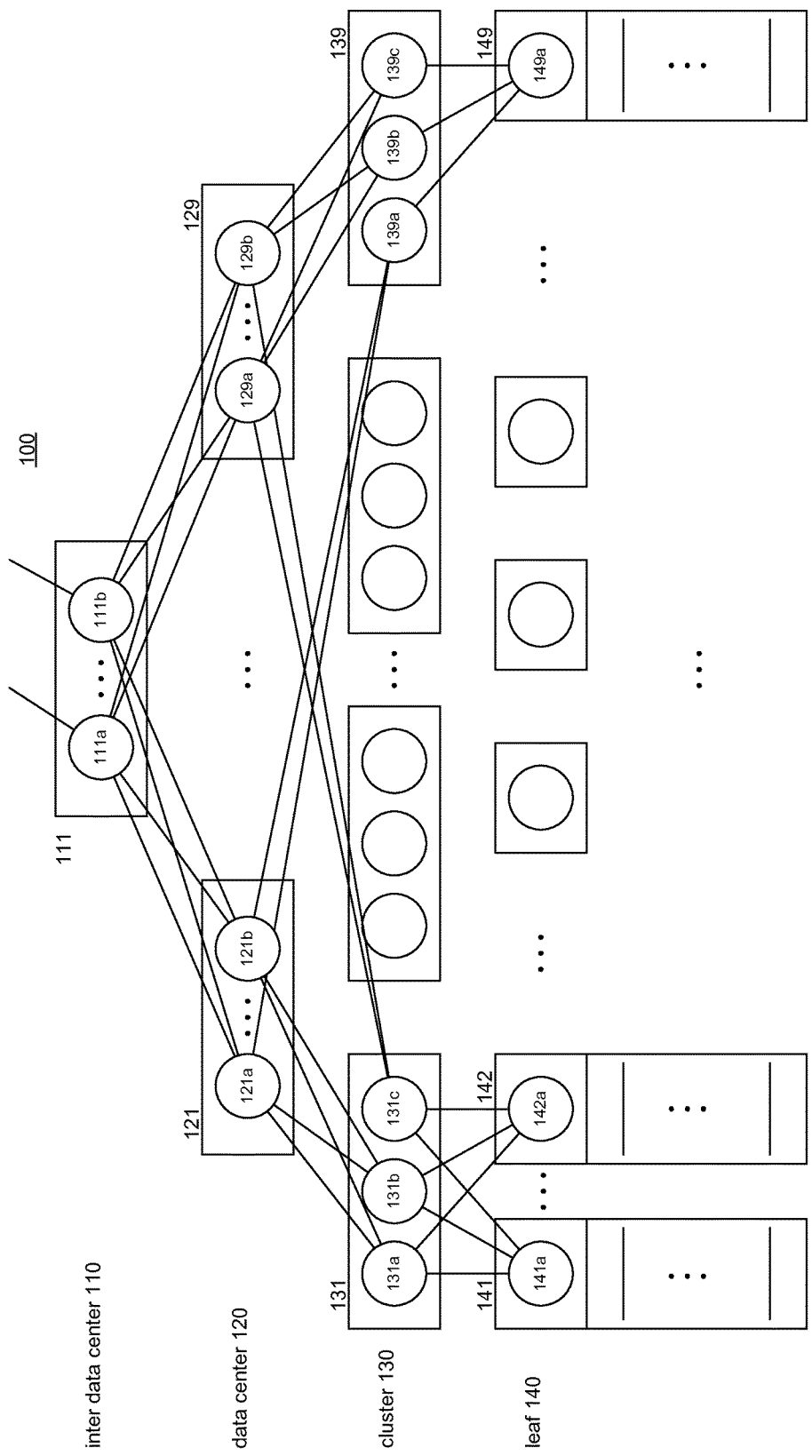
FIG. 1 illustrates a network interconnection system of a data center with hierarchically arranged routing devices.

A method and system for automatically validating a routing table of a routing device is provided. In some embodiments, a routing table validation ("RTV") system accesses the routing tables of the routing devices that map destination addresses to next hops of the routing devices. For example, the RTV system may periodically collect the routing tables directly from the routing devices or may collect the routing table of a routing device upon receiving notification that the routing table has changed. The RTV system also accesses, for each routing device, one or more contracts specifying desired behavior of the routing table of the routing device. Each contract for a routing device specifies a range of one or more destination addresses and permissible next hops for a packet with a destination address in the range. For example, a contract may specify that packets with addresses in the range of "10.0.0.24/31" should be routed to a next hop with either address 100.0.0.1 or address 100.0.0.2. As another example, a contract may specify that packets with addresses in the range of "120.0.128.0/25" should be routed to either address 192.168.0.0 or address 192.168.0.1. The RTV system generates a violation predicate from a routing table and a contract that, when evaluated for a target destination address and a target next hop of the routing device, indicates whether the routing table violates the contract. Continuing with the example, if the target destination address is 10.0.0.25 and the target next hop is at address 100.0.0.1 and the routing table complies with the contract, then the violation predicate returns a value of false to indicate that the contract is not violated. In contrast, if the target destination address is 10.0.0.25 and the target next hop is at address 100.0.0.1, but the routing table no longer maps that target destination address to the target next hop (e.g., because the next hop is offline), then the violation predicate returns a true to indicate that the contract is violated. The RTV system then solves each violation predicate for all possible combinations of target destination addresses and target next hops to determine whether the routing table violates the contract. To solve a violation predicate, the RTV system could use a brute-force approach by evaluating the violation predicate for each possible combination of target destination addresses and target next hops. So if the destination address is 32 bits and the number of next hops is 8, then the violation predicate is evaluated $2^{40}$ times. Such, a brute-force approach is generally impractical as the time required to perform so many evaluations would mean that a violation would be identified only long after the start of the violation. To identify a violation in a timely manner, the RTV system formulates the predicates as a constraint-based program and uses a constraint-based solver to solve the predicates. In some embodiments, the RTV system uses a satisfiability modulo theories ("SMT") solver, which is a constraint-base solver to solve the violation predicates. (See De Moura, L. and Bjorner, N., "Satisfiability Modulo Theories: Introduction and Applications," Comm. of ACM, vol. 54, no. 9, pp. 69-77, September 2011, which is hereby incorporated by reference.) When a violation predicate returns a value of true for a given input (i.e., target destination address and combination of target next hops), the routing table violates the contract of the violation predicate. In such a case, the RTV system can provide a notification of the target destination address and the combination of target next hops that violate the contract. In some cases, the RTV system may be able to direct the automatic correction of the violation. For example, if a violation indicates that a port in a routing table is not connected to a routing device (e.g., because a routing device that was a next hop has failed), then the RTV system can supply a routing table configuration tool with an updated configuration factoring in the failed routing device. The routing table configuration tool can then update the routing table of the routing device.

Referring to FIG. 1, the routing behavior of the routing devices at each level may be expressed by a set of high-level invariants for each level. The invariants for the leaf (or top of rack) routing devices may be expressed as follows:

| | Destination Address | Next Hop |
|---|---|---|
| 1. | $C_{DIP}$ | C's cluster devices or LAN |
| 2. | $C_{VIP}$ | C's cluster devices or SLB |
| 3. | Everything else | C's cluster devices | where $C_{DIP}$ represents the data center IP addresses ("DIPs") assigned to the cluster C that contains the leaf routing device and $C_{VIP}$ represents the virtual IP addresses ("VIPs") assigned to the cluster C of the leaf routing device. The first invariant specifies that the routing table of the routing device will map addresses in $C_{DIP}$ to the cluster routing devices of cluster C or a connection to a local area network of the rack. The second invariant specifies that the routing table will map addresses in $C_{VIP}$ to the cluster routing devices of cluster C or through a server load balancer ("SLB"). The third invariant specifies that the routing table will map all other addresses through the cluster routing devices of cluster C.

The invariants for the cluster routing devices may be expressed as follows.

| | Target Address | Next Hop |
|---|---|---|
| 1. | $C_{DIP}$ | C's leaf devices |
| 2. | $C_{VIP}$ | Subset of leaf or data center devices |
| 3. | Everything else | Data center devices |

The first invariant specifies that the routing table will map addresses in $C_{DIP}$ to the cluster's leaf routing devices. The second invariant specifies that the routing table will map addresses in $C_{VIP}$ to some subset of the leaf routing devices or data center routing devices. The third invariant specifies that the routing device will map all other addresses through the data center routing devices. Each of the other levels of routing devices would also have invariants specifying the behavior of the routing devices.

Invariants together specify desired properties of packet routing. For example, invariant 1 for the leaf routing devices and invariant 1 for the cluster routing devices combine to specify that all packets originating in cluster C and with a destination address in $C_{DIP}$ stay within cluster C's cluster routing devices and its leaf routing devices.

The RTV system uses contracts for each routing device to specify the permissible next hops for a range of addresses. A contract combines invariant information and the wiring connections between the routing devices to specify through which ports the packets with various address ranges are to be routed. A contract specifies an address range, next hops, and whether the next hops of the routing table should exactly match the next hops of the contract or can be a subset of the next hops of the contract. To comply with a contract, the routing table can have only the next hops that are specified by the contract. For example, if the addresses in $C_{DIP}$ are 10.0.0.0 to 10.0.0.255, and the cluster routing devices have addresses 100.0.0.1 and 100.0.0.2 and the LAN has addresses 100.0.0.3 and 100.0.0.4, as illustrated by Table 3, then the first contract for a leaf routing device in cluster C may be represented by the following first-order logic statement:

Contract 1: $(CVST(dst)$ & $Router(dst)) \rightarrow (port1 \; V \; port2 \; V \; port3 \; V \; port4)$ This statement specifies that the routing device should route packets with a destination address of dst that is in $C_{VIP}$ to some non-zero subset of port1, port2, port3, and port4. CVST(dst) is a predicate that returns true if dst is in $C_{VIP}$. Router(dst) is a predicate for a routing device that returns true if the routing table of the routing device is configured to route packets with the destination address of dst. So if dst is in $C_{VIP}$ and the routing table is configured to route packets with the destination of dst, as it should if the routing device is in cluster C, the contract states that the routing table maps dst to some combination of port1, port2, port3, or port4 and no other port.

A somewhat stronger contract for a leaf routing device in cluster C may be represented by the following first-order logic statement:

Contract 2: $(CVST(dst) \rightarrow (Router(dst)$ iff $(port1 \; V \; port2 \; V \; port3 \; V \; port4))$ This statement specifies that the routing device should route packets with a destination address of dst that is in $C_{VIP}$ to each of port1, port2, port3, and port4 and no other port. So, if dst is in $C_{VIP}$, the contract implies that the routing table maps dst only to each of port1, port2, port3, and port4.

In some embodiments, the RTV system may use a violation predicate that is a combination of a routing table predicate and a contract predicate. The predicates may be encoded using logic formulas that combine logical connectives (conjunction, disjunction, and negation) with atomic formulas in the form for linear arithmetic inequalities over bit-vector numerals. A routing table predicate encodes the actual routing table of a routing device. The routing table predicate evaluates to true when the routing table routes a target destination address to each of a combination of next hops of the routing device. The routing table predicate may be represented by Router(dst, n) where dst represents the target destination address and n represents a bit vector with one bit for each port (or next hop) of the routing device. For example, the following routing table predicate encodes the routing table of Table 3 where $n_x$ represents the bit value of the x element (i.e., port x) of the bit vector.

Router(dst,n)= if $(10.0.0.24 \le dst \le 10.0.0.25)$ then $(n_1 \; V \; n_2)$ else if $(10.0.0.0 \le dst \le 0.0.0.255)$ then $(n_1 \; V \; n_2 \; V \; n_3 \; V \; n_4)$ else if $(120.0.128.0 \le dst \le 120.0.128.127)$ then $(n_5 \; V \; n_6)$ else $(n_7 \; V \; n_8)$ In this example, if dst is 10.0.0.24 and at least $n_1$ and $n_2$ are 1, then the result is true. If, however, only $n_8$ is 1, then the result is false, meaning that the routing table does not map dst to $n_8$.

A contract predicate encodes a contract for a routing table and evaluates to true if the contract applies to the target destination address but not to the next hops. The contract predicate may be represented by K(dst, n). For example, if a contract has a form similar to contract 1 above and specifies that destination addresses in the range from 10.0.0.31 to 10.0.0.127 are to be mapped to some subset of (port1, port2, port3, port4), then the following contract predicate encodes the contract.

$K(dst,n) = (10.0.0.31 \le dst \le 0.0.0.127)$ & $\sim(n_1 \; V \; n_2 \; V \; n_3 \; V \; n_4)$ In this example, if dst is 10.0.0.31 and any combination of $n_1$, $n_2$, $n_3$, and $n_4$ are 1, then the predicate evaluates to false. If, however, only $n_5$ is 1, then the predicate evaluates to true meaning that the routing table should map dst, but not to $n_5$ so the mapping is a violation of the contract. The first term of the contract predicate may be considered an address predicate that evaluates to true if dst is in the address range, and the second term (i.e., $\sim(n_1 \; V \; n_2 \; V \; n_3 \; V \; n_4)$) may be considered a hops predicate that evaluates to true if n does not match the hops of the contract.

The routing table predicate and the contract predicate are combined to form the violation predicate as represented by the following:

Violation(dst,n)=Router(dst,n) & K(dst,n)

The violation predicate evaluates to true (i.e., indicating a violation) only when the contract specifies the target destination address but not the target next hops and the router table maps the target destination address to the target next hops indicating a violation. For example, assume that the routing table incorrectly mapped destination addresses 10.0.0.0 and 10.0.0.254 to $n_9$ as represented by the highlighting in the following routing table predicate.

Router(dst,n)= if $(10.0.0.24 \le dst \le 10.0.0.25)$ then $(n_1 \; V \; n_2)$ else if $(10.0.0.0 \le dst \le 0.0.0.255)$ then $(n_1 \; V \; n_2 \; V \; n_3 \; V \; n_4 \; V \; n_9)$ else if $(120.0.128.0 \le dst \le 120.0.128.127)$ then $(n_5 \; V \; n_6)$ else $(n_7 \; V \; n_8)$ When the target destination address is 10.0.0.0 and only $n_9$ is set to 1, then the routing table predicate evaluates to true, meaning that the routing table maps that address to that next hop. The contract predicate will also evaluate to true because the target destination address is covered by the contract, but none of $n_1$, $n_2$, $n_3$, and $n_4$ are 1, meaning that the mapping would be a violation of the contract. Thus, because the routing table does have a mapping that would be a violation of the contract, the violation predicate evaluates to true.

The above describes a violation predicate when the contract has a form similar to contract 1. When the contract has a form similar to contract 2, a violation predicate needs an additional test to ensure that the violation predicate evaluates to true if a routing table does not map a destination addresses to each of the ports specified in the contract. This test can be represented as follows:

$$(CVST(dst) \ \& \ (port1 \ V \ port2 \ V \ port3 \ V \ port4)) \rightarrow Router(dst)$$

This test means for any destination address covered by the contract, the routing table predicate evaluates to true, only for port1, port2, port3, and port4. This test can be represented by an auxiliary contract as follows:

$$K'(dst,n) = (10.0.0.31 \leq dst \leq 0.0.0.127) \ \& \ (n_1 \ V \ n_2 \ V \ n_3 \ V \ n_4)$$

The violation predicate can be represented as follows:

$$Violation(dst,n) = (Router(dst,n) \ \& \ K(dst,n)) V (\sim Router(dst,n) \ \& \ K'(dst,n))$$

This violation predicate evaluates to true when, for example, the routing table does not map 10.0.0.31 to $n_2$, which is a violation of the contract that the address is to map to each of ports $n_1$, $n_2$, $n_3$, and $n_4$.

Table 4 illustrates the results of the predicates for combinations of dst and n when the contract specifies to map destination address 1 only to next hop 1. A 1 in the column dst indicates dst is the destination address 1, and a 1 in column n indicates that the n includes next hop 1. The other columns indicate the resulting values of the predicates assuming that the routing device does not violate the contract. Since Router is true only when the dst is the destination address but K is false, there is no violation of the contract. Table 5, in contrast, illustrates the results when there is a violation. In this case, Router is true when n is not the next hop 1, meaning the routing table maps to an address that is not next hop 1. In this case, since the routing table predicate evaluates to true and the contract predicate evaluates to true, the violation predicate evaluates to true.

TABLE 4

| dst | n | Router | K = hops & address | | Violation |
|---|---|---|---|---|---|
| 0 | 0 | F | T | F | F |
| 0 | 1 | F | F | F | F |
| 1 | 0 | F | T | T | F |
| 1 | 1 | T | F | T | F |

TABLE 5

| dst | n | Router | K = ~hop & address | | Violation |
|---|---|---|---|---|---|
| 0 | 0 | F | T | F | F |
| 0 | 1 | F | F | F | F |
| 1 | 0 | T | T | T | T |
| 1 | 1 | T | F | T | F |

Figure 2:
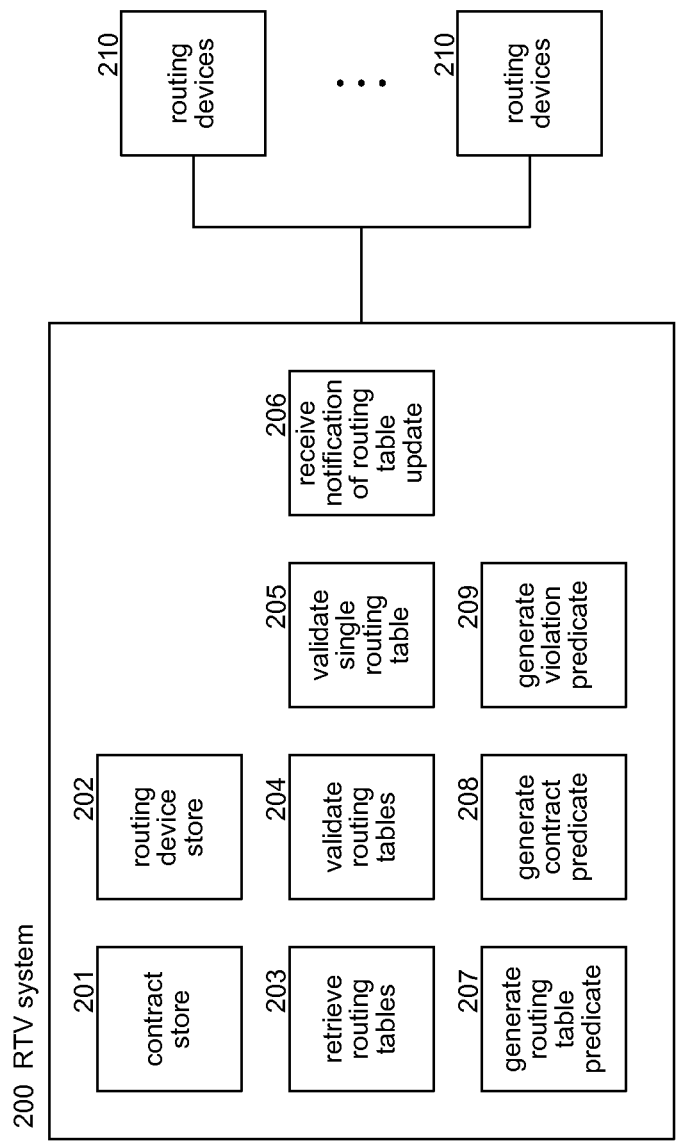
FIG. 2 is a block diagram that illustrates components of a routing table validation system in some embodiments.

FIG. 2 is a block diagram that illustrates components of a routing table validation system in some embodiments. The RTV system 200 includes a contract store 201 and a routing device store 202. The contract store stores the contracts for each routing device of the network interconnection system. The routing device store stores information on each of the routing devices such as number of ports, level within the network interconnection system, and so on. The RTV system also includes a retrieve routing tables component 203, a validate routing tables component 204, a validate single routing table component 205, a receive notification of routing table update component 206, a generate routing table predicate component 207, a generate contract predicate component 208, and a generate violation predicate component 209. The retrieve routing tables component retrieves the routing tables from the various routing devices and may store them in the routing device store. The RTV system may invoke the retrieve routing tables component on a periodic basis to periodically validate using the current routing tables. The validate routing tables component is invoked to validate all the routing tables within the network interconnection system. The validate single routing table component is invoked to validate a single routing table. The receive notification of routing table update component receives notification when a routing table has been updated and may invoke the retrieve routing tables component to retrieve the routing table and invoke the validate routing table component to validate that routing table. The generate routing table predicate component generates a routing table predicate based on the current routing table of a routing device. The generate contract predicate component generates a contract predicate for a contract for a routing device. The generate violation predicate generates a violation predicate as a conjunction of the routing table predicate and the contract predicate. The RTV system may connect to the routing devices 210 through the network interconnection system.

The computing systems on which the RTV system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the RTV system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The RTV system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the RTV system may be implemented in hardware using, for example, an application-specific integrated circuit (ASIC).

Figure 3:
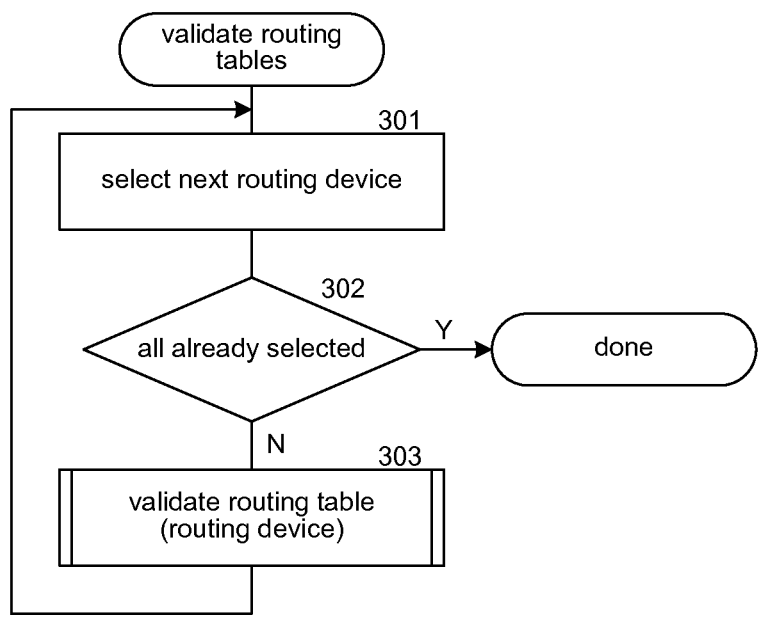
FIG. 3 is a flow diagram that illustrates the processing of a validate routing tables component in some embodiments.

FIG. 3 is a flow diagram that illustrates the processing of a validate routing tables component in some embodiments. A validate routing tables component 300 is invoked to validate the routing tables of a data center. In block 301, the component selects the next routing device. In decision block 302, if all the routing devices have already been selected, then the component completes, else the component continues at block 303. In block 303, the component invokes the validate routing single table component to validate the routing table for the selected routing device. The component then loops to 301 to select the next routing device.

Figure 4:
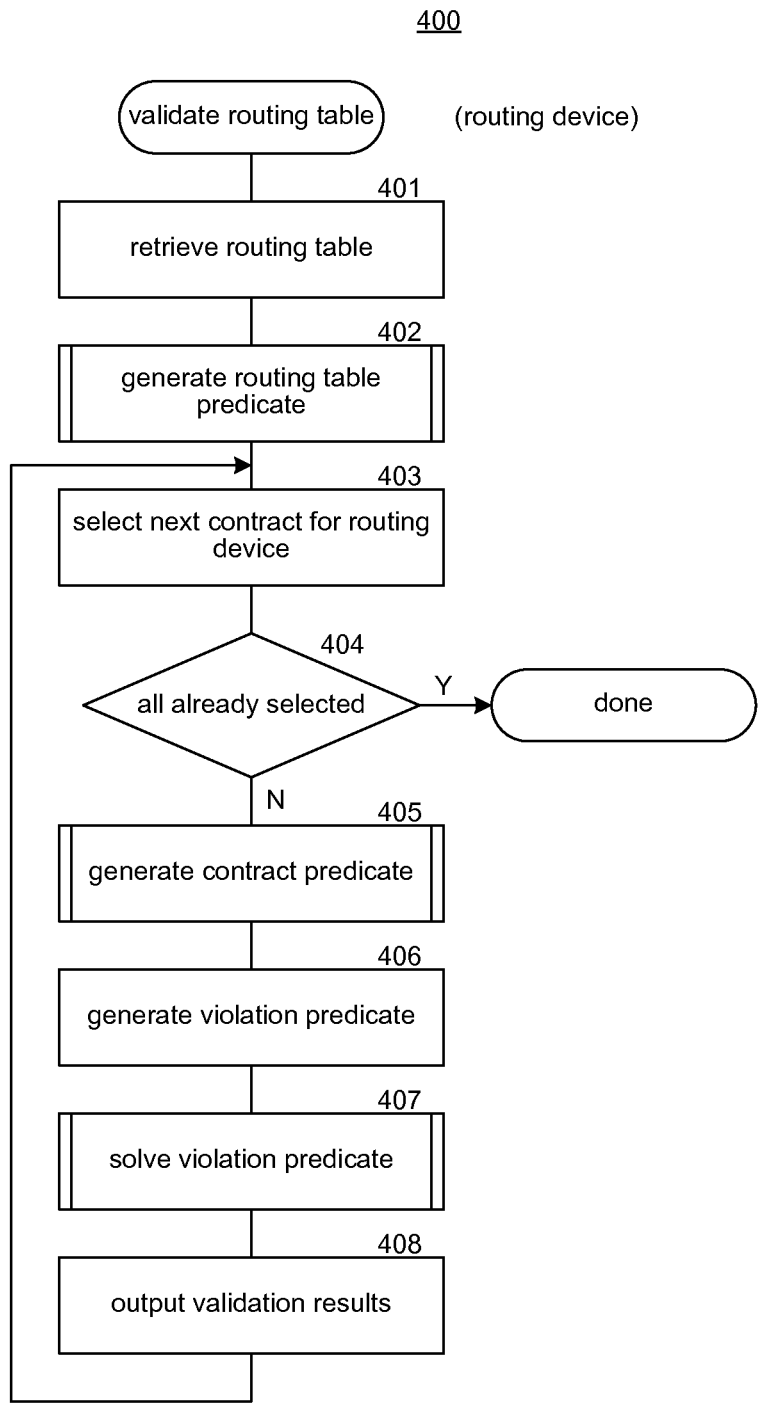
FIG. 4 is a flow diagram that illustrates the processing of a validate single routing table component in some embodiments.

FIG. 4 is a flow diagram that illustrates the processing of a validate single routing table component in some embodiments. A validate routing table component 400 is passed an indication of a routing device and validates the routing table of that routing device. In block 401, the component retrieves the routing table. The component may retrieve the routing table directly from the routing device or, if the routing table was previously retrieved, then the component may retrieve the routing table from the routing device store. In block 402, the component invokes a generate routing table predicate component. In blocks 403-408, the component loops generating a violation predicate and determining whether a violation has occurred. In block 403, the component selects the next contract for the routing device. In decision block 404, if all the contracts for the routing device already been selected, then the component completes, else the component continues at block 405. In block 405, the component invokes a generate contract predicate component to generate a contract predicate for the selected contract. In block 406, the component generates a violation predicate that is a conjunction of the routing table predicate and the contract predicate. In block 407, the component invokes a solve violation predicate component to identify any violations of the contract. As discussed above, the violation predicate may be solved using an SMT solver or other constraint-based solver or if the problem space is very small, using a brute-force approach. As an optimization, prior to solving the violation predicate, the component may check for overlaps in addresses between rules of the routing table and the contract. If there is no overlap in addresses, the component may remove the corresponding test from the routing table it will not result in a violation of the contract. In block 408, the component outputs the validation results that indicate any violations and then loops to block 403 to select the next contract for the routing device.

Figure 5:
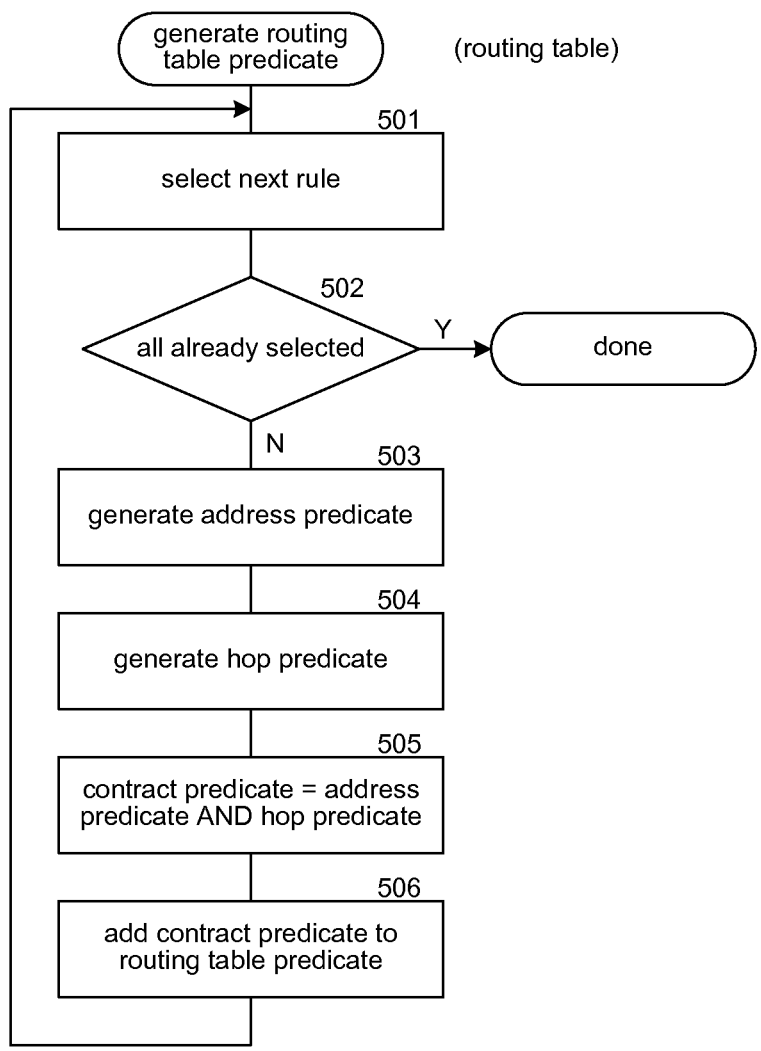
FIG. 5 is a flow diagram that illustrates the processing of a generate routing table predicate component in some embodiments.

FIG. 5 is a flow diagram that illustrates the processing of a generate routing table predicate component in some embodiments. A generate routing table predicate component 500 is passed a routing table and returns the routing table predicate. In block 501, the component selects the next rule of the routing table. In decision block 502, if all the rules have already been selected, then the component completes, else the component continues at block 503. In block 503, the component generates an address predicate for the rule. In block 504, the component generates a hop predicate for the rule. In block 505, the component generates a contract predicate as a conjunction of the address predicate and the hop predicate. In block 506, the component adds the contract predicate to the routing table predicate and then loops to block 501 to select the next rule of the routing table.

Figure 6:
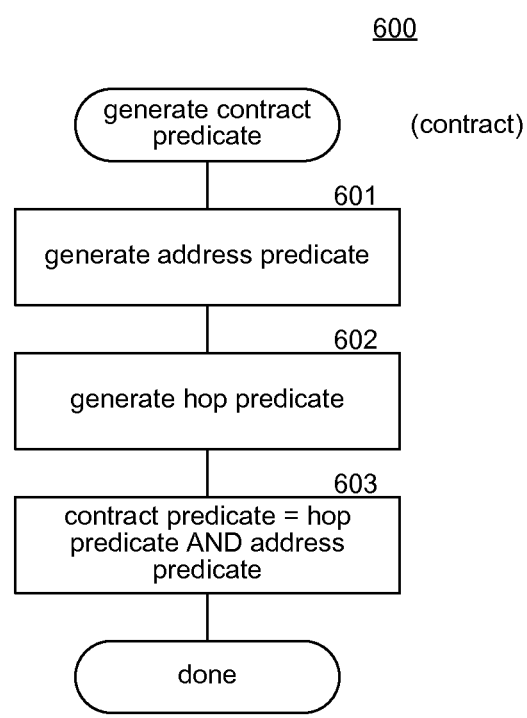
FIG. 6 is a flow diagram that illustrates the processing of a generate contract predicate component in some embodiments.

FIG. 6 is a flow diagram that illustrates the processing of a generate contract predicate component in some embodiments. A generate contract predicate component 600 is passed a contract and returns the contract predicate. In block 601, the component generates an address predicate for the contract. In a block 602, the component generates a hop predicate for the contract. In block 603, the component generates the contract predicate as the conjunction of the hop predicate and the address predicate. The component then completes.

Figure 7:
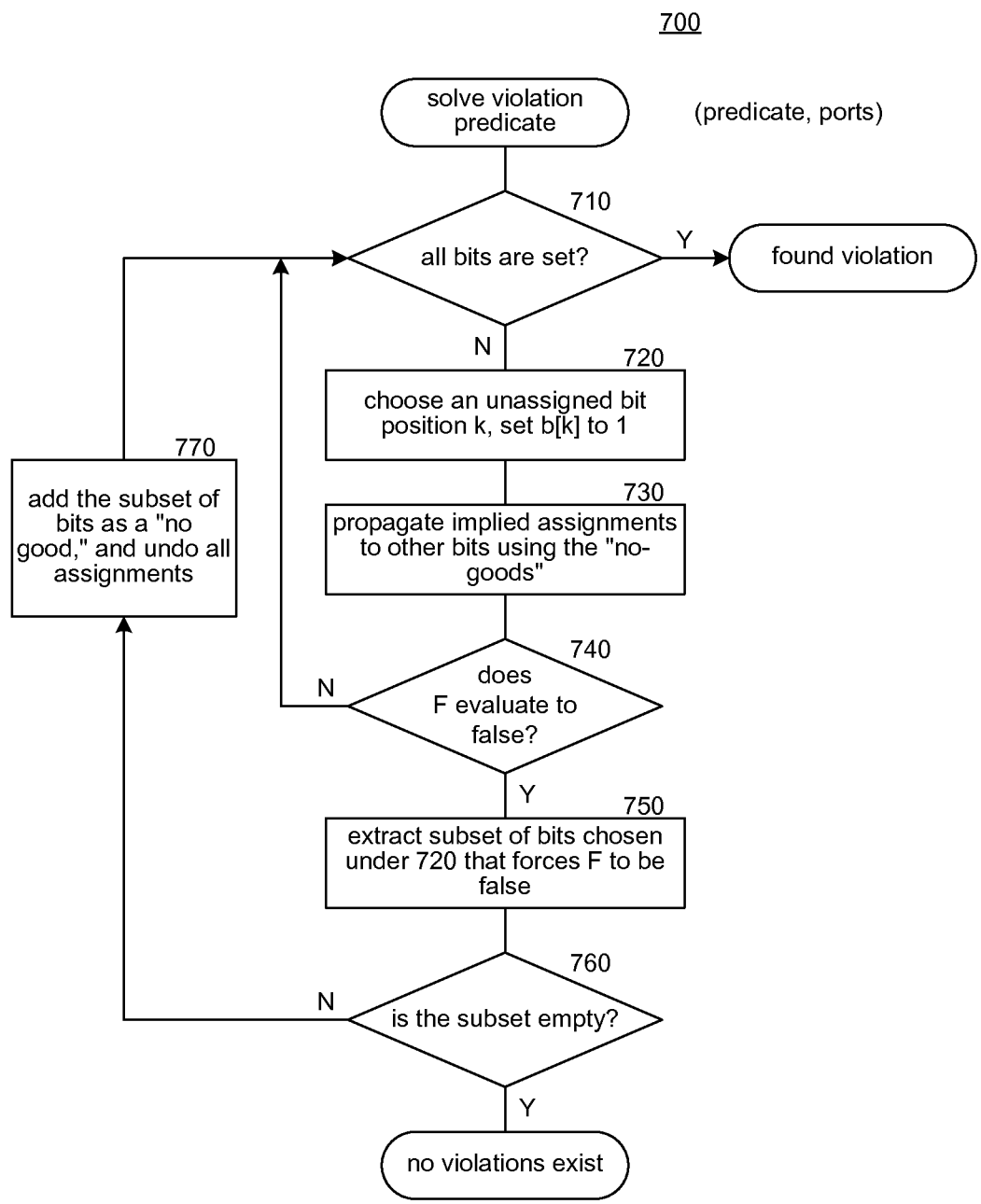
FIG. 7 is a flow diagram that illustrates the processing of a solve violation predicate component in some embodiments.

FIG. 7 is a flow diagram that illustrates the processing of a solve violation predicate component in some embodiments. A solve predicate violation component 700 is passed a violation predicate for a routing device and an indication of the number of ports of the routing device and solves the violation predicate. The description of the component provides simplified example of constraint solving methods. The component inputs a violation predicate over a set of bits $b[1], b[m]$, where m is a number (e.g., m=40 bits comprising 32 bits for a destination address and 8 bits for next hops). The component seeks to find an assignment to bits $b[1]$, $b[m]$ that satisfies the violation predicate (i.e., a violation), or alternatively establish that there is no assignment to the bits that satisfy the violation predicate (i.e., no violation). The component maintains a set of "no-goods." Each no-good is a subset of bit positions taken from $\{1, \ldots, m\}$. For example if m=5, then a possible no-good is the set $\{1, 4, 5\}$. A no-good encodes a set of bit positions that cannot simultaneously be set to 1 and have the violation predicate evaluate to true. In decision block 710, if all bits have been assigned values, then the violation predicate evaluates to true and the component reports a violation, else the component continues at block 720. In block 720, the component chooses an unassigned bit position k (where $1 \leq k \leq m$) and assigns a 1 to $b[k]$. In block 730, the component propagates bit assignments using the no-goods. If all but one bit in a no-good is assigned to 1, then the last bit in the no-good is assigned to 0. For example if $b[1]$ and $b[5]$ have been assigned to 1, then $b[4]$ is assigned to 0 as a consequence of the no-good $\{1, 4, 5\}$. The component then evaluates the violation predicate under the resulting assignment. The violation predicate may evaluate to true, false, or unknown. The violation predicate evaluates to unknown if it is not possible to determine the truth value of the violation predicate with the partial assignment. In decision block 740, if the violation predicate evaluates to false, then there is a subset of bits set to 1 that force the violation predicate to false and the component continues at block 750, else the component loops to block 710 to determine if all the bits have been assigned. In block 750, the component extracts the subset. In decision block 760, if the subset is empty, then the component reports a violation because there is no assignment to bits that result in the violation predicate evaluating to true, else the component continues at block 770. In block 770, the component adds the extracted subset to the set of no-goods, un-assigns all the bits, and loops to block 710. Current SAT/SMT solvers provide efficient techniques to evaluate predicates under a partial assignment and to extract no-goods as subsets of partial assignments. Furthermore, advanced SAT/SMT solvers use many more optimizations beyond this exemplary constraint solving component.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the RTV system may solve the violation predicates in parallel using multiple computing systems, multiple cores, multiple processes, and multiple threads. The RTV system may create a separate thread for each violation predicate. Accordingly, the invention is not limited except as by the appended claims.

The invention claimed is:

1. A method performed by a computing device for validating a routing table of a routing device, the method comprising:
    accessing the routing table of the routing device, the routing table mapping destination addresses to a next hop of the routing device;
    accessing a contract specifying desired behavior of the routing table of the routing device, the contract specifying destination addresses and permissible next hops;
    generating a violation predicate from the routing table and the contract that, when evaluated for a destination address and a next hop of the routing device, indicates whether the routing table violates the contract; and
    solving the violation predicate for combinations of destination addresses and next hops to determine whether the routing table violates the contract,
    wherein the routing table includes one or more rules that specify a destination address range and one or more next hops, and
    wherein the generating includes:
        determining whether the destination address range of a rule overlaps the destination addresses specified by the contract; and
        when there is no overlap, suppressing use of that rule within the violation predicate.

2. The method of claim 1 wherein the solving is performed using a satisfiability modulo theories solver.

3. The method of claim 1 further comprising accessing multiple contracts specifying multiple desired behaviors of the routing table of the routing device, generating a violation predicate for each contract, and solving the violation predicates.

4. The method of claim 1 wherein the contract specifies a destination address range, permissible next hops, and whether a subset of next hops is permissible.

5. The method of claim 1 wherein the violation predicate is based on a routing table predicate for the routing table and a contract predicate for the contract.

6. The method of claim 5 wherein the routing table predicate is satisfied when the routing table indicates that a packet with a target destination address is able to be routed to the hops in a target subset of next hops of the routing device.

7. The method of claim 5 wherein the contract predicate is based on an address predicate, indicating whether a target address is within a destination address range of the contract, and a hop predicate, indicating whether a target hop is not a next hop of the contract.

8. A method performed by a computing device for validating a routing table of a routing device, the method comprising:
    accessing the routing table of the routing device, the routing table mapping destination addresses to a next hop of the routing device;
    accessing a contract specifying desired behavior of the routing table of the routing device, the contract specifying destination addresses and permissible next hops;
    generating a violation predicate from the routing table and the contract that, when evaluated for a destination address and a next hop of the routing device, indicates whether the routing table violates the contract; and
    solving the violation predicate for combinations of destination addresses and next hops to determine whether the routing table violates the contract,
    wherein the violation predicate is based on a routing table predicate for the routing table and a contract predicate for the contract, and
    wherein the routing table predicate is satisfied when the routing table indicates that a packet with a target destination address is able to be routed to the hops in a target subset of next hops of the routing device.

9. The method of claim 8 wherein the solving is performed using a satisfiability modulo theories solver.

10. The method of claim 8 further comprising accessing multiple contracts specifying multiple desired behaviors of the routing table of the routing device, generating a violation predicate for each contract, and solving the violation predicates.

11. The method of claim 8 wherein the contract specifies a destination address range, permissible next hops, and whether a subset of next hops is permissible.

12. The method of claim 8 wherein the contract specifies a destination address range and required next hops.

13. The method of claim 8 wherein the routing table specifies one or more rules that specify a destination address range and one or more next hops.

14. The method of claim 13 further comprising:
    determining whether the destination address range of a rule overlaps the destination addresses specified by the contract; and
    when there is no overlap, suppressing the use of that rule within the violation predicate.

15. The method of claim 8 wherein the contract predicate is based on an address predicate, indicating whether a target address is within a destination address range of the contract, and a hop predicate, indicating whether a target hop is not a next hop of the contract.

16. A method performed by a computing device for validating a routing table of a routing device, the method comprising:
    accessing the routing table of the routing device, the routing table mapping destination addresses to a next hop of the routing device;
    accessing a contract specifying desired behavior of the routing table of the routing device, the contract specifying destination addresses and permissible next hops;
    generating a violation predicate from the routing table and the contract that, when evaluated for a destination address and a next hop of the routing device, indicates whether the routing table violates the contract; and
    solving the violation predicate for combinations of destination addresses and next hops to determine whether the routing table violates the contract, wherein:
    the violation predicate is based on a routing table predicate for the routing table and a contract predicate for the contract,
    the contract predicate is based on an address predicate and a hop predicate,
    the address predicate indicates whether a target address is within a destination address range of the contract, and the hop predicate indicates whether a target hop is not a next hop of the contract.

17. The method of claim 16 wherein the solving is performed using a satisfiability modulo theories solver.

18. The method of claim 16 further comprising accessing multiple contracts specifying multiple desired behaviors of the routing table of the routing device, generating a violation predicate for each contract, and solving the violation predicates.

19. The method of claim 16 wherein the contract specifies a destination address range, permissible next hops, and whether a subset of next hops is permissible.

20. The method of claim 16 wherein the contract specifies a destination address range and required next hops.

21. The method of claim 16 wherein the routing table specifies one or more rules that specify a destination address range and one or more next hops.

22. The method of claim 21 further comprising:
determining whether the destination address range of a rule overlaps the destination addresses specified by the contract; and
when there is no overlap, suppressing the use of that rule within the violation predicate.

23. The method of claim 16 wherein the routing table predicate is satisfied when the routing table indicates that a packet with a target destination address is able to be routed to each of the hops in a target subset of next hops of the routing device.

\* \* \* \* \*